L. J. ATWOOD.
Lamp.
No. 3,019. Reissued June 30, 1868.
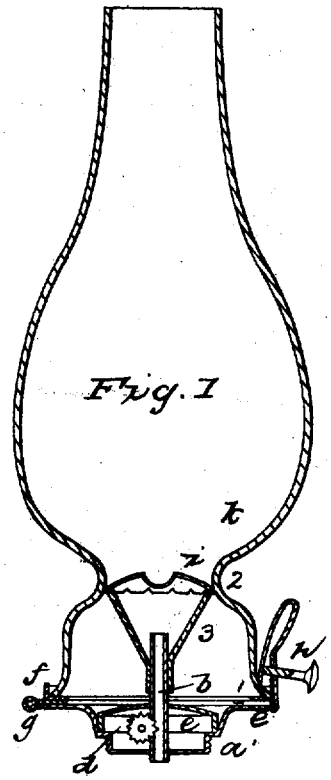
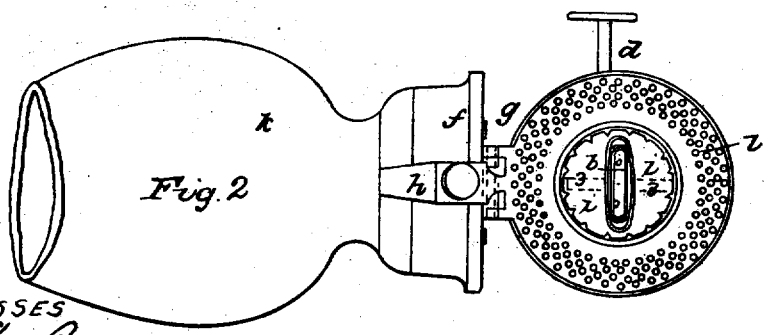
WITNESSES
J. A. Bunnell
E. D. Gripps.
INVENTOR
L. J. Atwood
N. PETERS, Photo-Lithographer, Washington, D. C.

UNITED STATES PATENT OFFICE.

LEWIS J. ATWOOD, OF WATERBURY, CONNECTICUT, ASSIGNEE, BY MESNE ASSIGNMENTS, OF HIMSELF.

LAMP.

Specification forming part of Letters Patent No. 40,226, dated October 13, 1863; Reissue No. 3,019, dated June 30, 1868.

*To all whom it may concern:*

Be it known that I, LEWIS J. ATWOOD, of Waterbury, in the county of New Haven and State of Connecticut, have invented, made, and applied to use a certain new and useful Improvement in Lamps; and I do hereby declare the following to be a full, clear, and exact description of the same, reference being made to the annexed drawings, making part of this specification, wherein—

Figure 1 is a vertical section of my lamp-burner, and Fig. 2 is a plan of the burner with the chimney turned back.

Similar marks of reference denote the same parts.

Lamps have heretofore been constructed with a diaphragm in the chimney, and burners have also been made with a deflector over the wick to direct the air to the flame, so that the lamp would not require a chimney. In the first-named instance no provision was made for admitting an auxiliary draft between the draft-plate and the chimney; neither was there any support for the draft-plate except that derived from the fragile glass chimney itself; and the chimney was not clamped to a hinged chimney-holder, so that it could be turned off from the wick-tube to give access in lighting or trimming.

The nature of my said invention consists, first, in a draft-plate deriving its support from the burner, so as to be independent of the glass chimney and not liable to be disturbed or deranged by the breaking of the chimney, in combination with a chimney-holder that is below the edge of the draft-plate, so that the light can shine through the chimney both above and below said draft-plate; second, in an opening or openings between the said draft-plate and the interior of the chimney to allow an auxiliary draft to the flame; third, in combining with said draft-plate and chimney-holder a perforated air-distributer that causes the draft to pass with uniformity to the flame; fourth, in combining with said draft-plate and chimney-holder a hinge connecting the chimney-holder with the burner, so that the chimney can be turned aside from the wick-tube to give access in lighting or trimming; and, fifth, in connecting the draft-plate to the burner by a slide, so that it may be adjusted in relation to the wick-tube or removed therefrom to give full access to the wick-tube.

In the drawings, *a* represents the screw of the burner, taking the neck of any ordinary reservoir; *b* is the wick-tube and *c* is the ratchet-cap; *d* is the wick-raiser, all as usual. A perforated flange, *e*, surrounds the burner *a* and forms an air-distributer.

*f* is a ring hinged at *g*, and provided with the spring *h* or chimney-clamp to take and retain the flange 1 of the chimney *k*.

2 represents the narrow part or neck of the chimney, and the shape of this chimney may be varied as desired.

The draft-plate *i*, of metal or other material, has in its center an opening of the size and shape required for the flame. This draft-plate is to be supported by arms 3 3 from the wick-tube *b* or burner, said arms terminating as a slide or support which allows the draft-plate to be removed for giving full access to the wick, or adjusted to the exact point required for producing the best light, reference being had to the character of oil used, the exact shape of chimney, and the amount of draft required, (and any slight variation in the shape of the chimney that is shown can be allowed for by raising or lowering the draft-plate;) and this draft-plate does not obstruct the light, but allows it to shine through the chimney both above and below the draft-plate.

The operation of this burner is that the draft-plate *i* and lower part of the chimney direct the draft (passing through the distributer *e*) upon the flame and produce a perfect combustion; at the same time the light is not in the least obstructed, and the cones and deflectors heretofore employed are dispensed with.

In cases where a second or auxiliary draft is required in the chimney an annular space may be left around the draft-plate *i*, between that and the glass chimney, or the edge of said draft plate may be notched. (See Fig. 2.) In either case the required amount of air can be admitted to the chimney above this draft-plate by the said opening or openings, to perfect combustion in the upper portions of the flame, which draft may be regulated according to the proximity of the edge of the draft-plate to the inside of the chimney, or the size or shape of the notches around the edge of said draft-plate.

I do not claim a chimney fitted so as to serve the purpose of a deflector and at the same time transmit light both above and below the flame; neither do I claim a diaphragm or draft-plate in the chimney, as these have before been used.

I do not claim a flat draft-plate placed in the chimney, as that has been used; but it is not adapted to properly directing the draft to the flame; and I do not claim a concave deflector or cone applied to the burner itself at or below the lower end of the chimney; neither do I lay claim to a lamp in which the light shines through a transparent material below the draft-plate. My lamp, however, is superior to those before mentioned in consequence of the peculiar construction and combination of devices set forth and claimed.

What I claim, and desire to secure by Letters Patent, is—

1. A concave draft-plate having an elongated slot, in combination with a chimney-holder below the edges of that draft-plate, and attached to the burner, substantially as set forth, so that the flame will be spread and the light shine both above and below the draft-plate.

2. An opening or series of openings between the said concave draft-plate and the interior of the chimney to allow an auxiliary draft to pass to the flame, in combination with a foraminous air-distributer connected to the burner, substantially as set forth.

3. A foraminous air-distributer, *e*, formed with or connected to the burner, in combination with a draft-plate supported from the burner and within the chimney, substantially as specified, whereby the action of the air on the flame is regulated by the joint action of said draft-plate, air-distributer, and chimney.

4. An air-distributer, substantially as specified, in combination with the draft-plate and a glass chimney having a contraction or neck at or near the said draft-plate, whereby the said draft-plate can be made smaller than with a straight or tapering chimney and not obstruct the light, substantially as shown.

5. The chimney-holder and the aforesaid draft-plate, in combination with mechanism, substantially as specified, for connecting the chimney-holder to the burner, whereby the chimney can be removed for trimming or lighting without being detached.

6. Connecting the said draft-plate to the burner by a slide, so that it may be adjusted in position or removed, substantially as and for the purposes set forth.

In witness whereof I have hereunto set my signature this 12th day of November, A. D. 1867.

L. J. ATWOOD.

Witnesses:
JAS. M. ABBOTT,
J. McWHINNIE.